(12) United States Patent
Shioda

(10) Patent No.: US 11,886,757 B2
(45) Date of Patent: Jan. 30, 2024

(54) IMAGE FORMING APPARATUS, METHOD, AND STORAGE MEDIUM STORING PROGRAM

(71) Applicant: CANON KABUSHIKI KAISHA, Tokyo (JP)

(72) Inventor: Michinori Shioda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/873,440

(22) Filed: Jul. 26, 2022

(65) Prior Publication Data

US 2023/0051356 A1 Feb. 16, 2023

(30) Foreign Application Priority Data

Aug. 13, 2021 (JP) .................................. 2021-132063

(51) Int. Cl.
*G06F 3/12* (2006.01)

(52) U.S. Cl.
CPC .......... *G06F 3/1205* (2013.01); *G06F 3/1219* (2013.01); *G06F 3/1258* (2013.01); *G06F 3/1284* (2013.01)

(58) Field of Classification Search
CPC .... G06F 3/1205; G06F 3/1219; G06F 3/1258; G06F 3/1284; G06F 3/1239
See application file for complete search history.

(56) References Cited

U.S. PATENT DOCUMENTS

| 8,325,370 B2 | 12/2012 | Hashimoto | |
| 8,451,479 B2* | 5/2013 | Nishiyama | ......... H04N 1/00347 358/1.9 |
| 2018/0183970 A1* | 6/2018 | Kawai | ................ H04N 1/32122 |
| 2019/0278211 A1* | 9/2019 | Itoh | .................... G03G 15/5091 |

FOREIGN PATENT DOCUMENTS

| JP | 2010-108470 A | 5/2010 |
| JP | 2018-099895 A | 6/2018 |

* cited by examiner

*Primary Examiner* — John R Wallace
(74) *Attorney, Agent, or Firm* — VENABLE LLP

(57) ABSTRACT

In an image forming apparatus where an amount to be printed due to execution of a job designating printing according to a first printing mode exceeds a first printable amount, a screen is displayed to accept an instruction for changing printing according to the first printing mode designated by the job to printing according to a second printing mode. When the instruction is accepted on the screen, a print setting screen which is able to accept a change of print setting of the job is displayed. If an amount printed according to the second printing mode would exceed the second printable amount even if print setting of the job is changed, the print setting screen is repeatedly displayed until print setting of the job is set such that the amount to be printed on printing according to the second printing mode does not exceed the second printable amount.

14 Claims, 7 Drawing Sheets

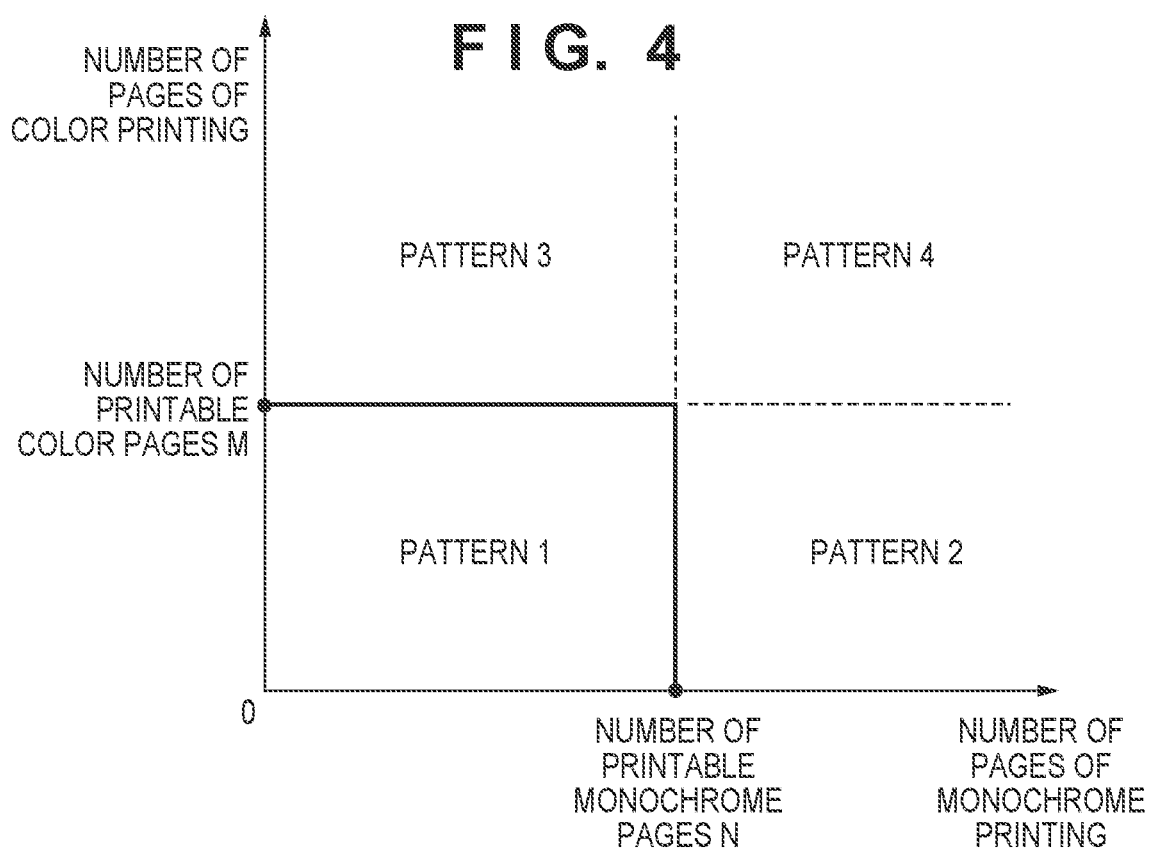
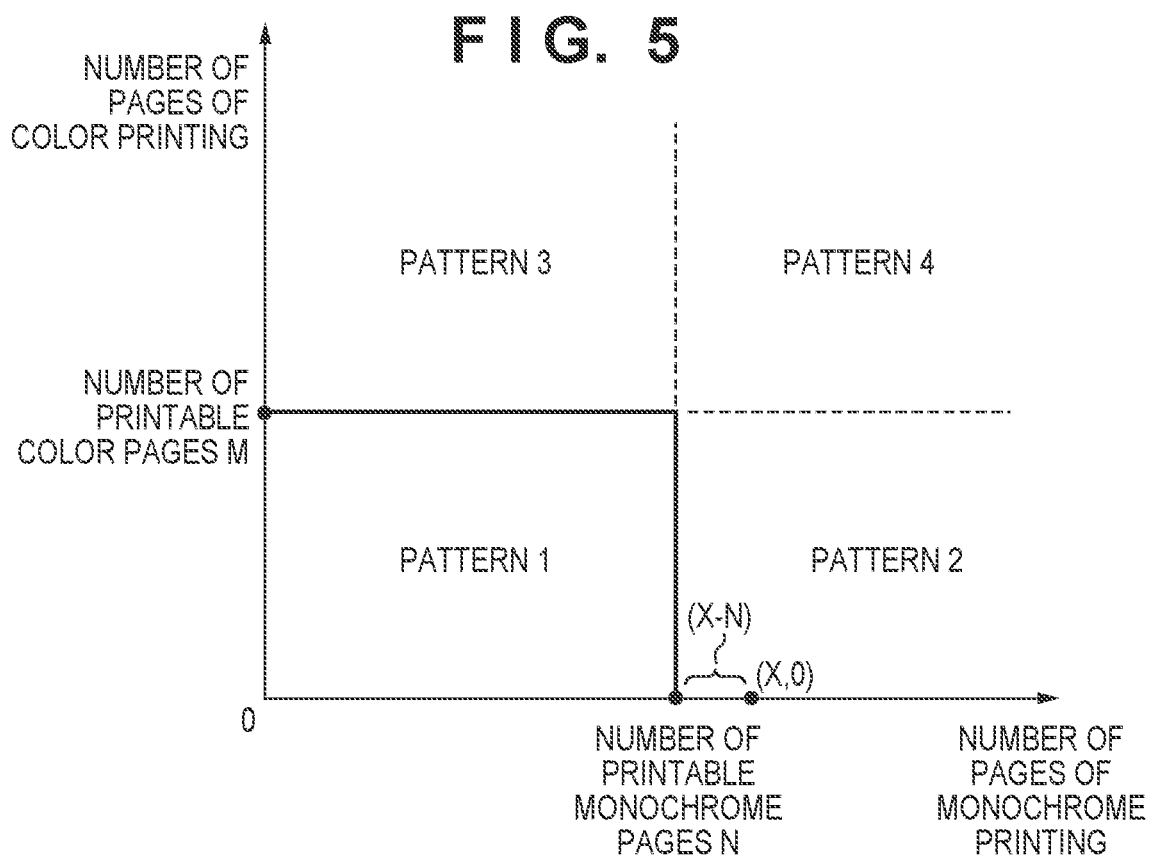

[MESSAGE]

FIXED AMOUNT RANGE FOR COLOR PRINTING WILL BE EXCEEDED. ~701
1. PRINT ANYWAY (CONTINUE) ~702
2. PRINT WITHIN FIXED AMOUNT RANGE AND CANCEL REMAINDER? ~703
3. SUBSTITUTION PRINTING WITH COLOR AND MONOCHROME TO PRINT
   TO THE FIXED AMOUNT RANGE? (SUBSTITUTION PRINT) ~704
4. CANCEL PRINT JOB? ~705

| CONTINUE | PRINT PARTIALLY | SUBSTITUTION PRINT | CANCEL |

706　　707　　708　　709

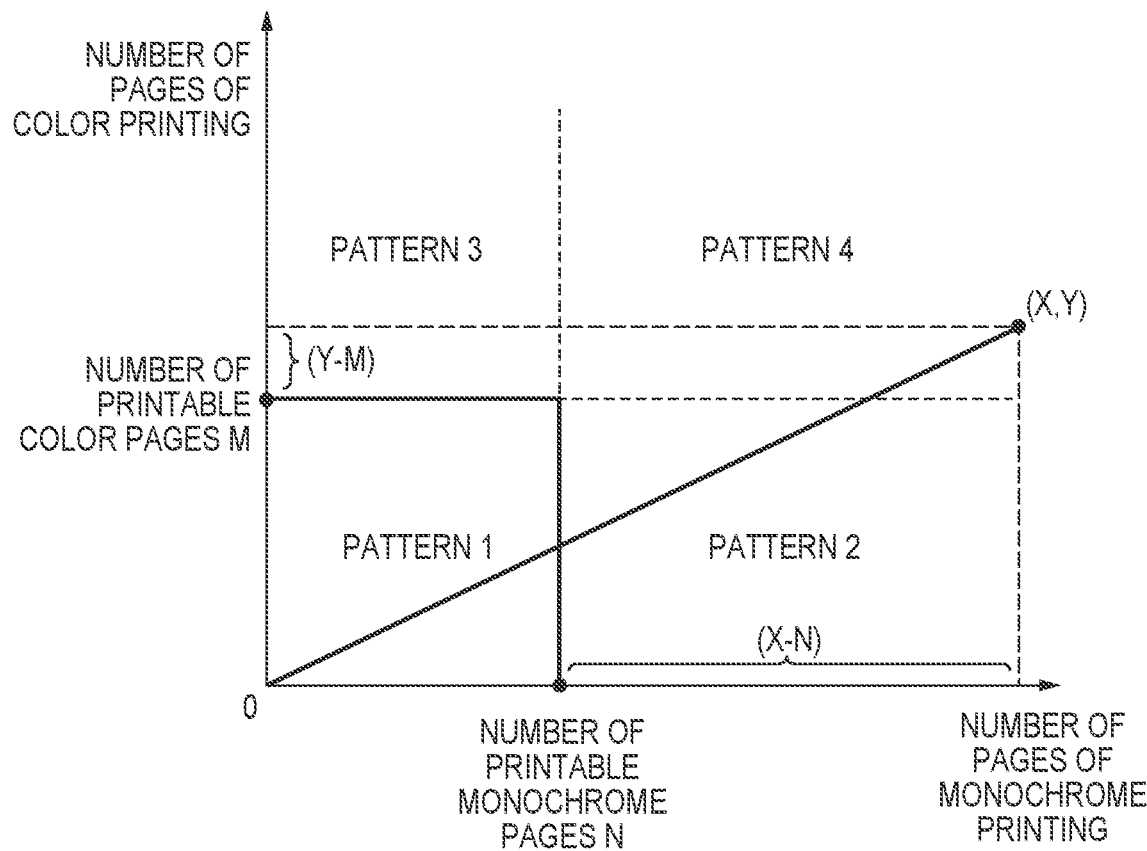

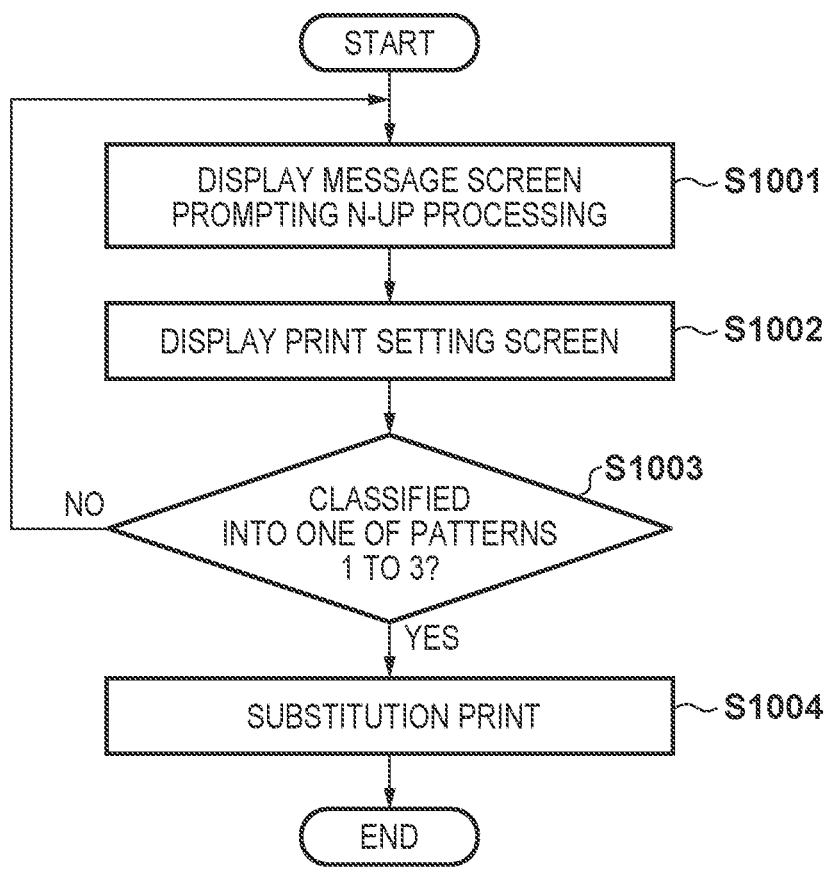

IMAGE FORMING APPARATUS, METHOD, AND STORAGE MEDIUM STORING PROGRAM

BACKGROUND OF THE INVENTION

Field of the Invention

The present invention relates to an image forming apparatus, a method, and a storage medium storing a program.

Description of the Related Art

In some printing systems, print data is temporarily stored in a hard disk drive (HDD) in a multifunction device or a server, and printing is executed in response to a user's final print instruction. The printing cost per sheet is lower for monochrome printing than for color printing. Therefore, in order to reduce the printing cost, lower cost monochrome printing is sometimes performed.

Japanese Patent Laid-Open No. 2010-108470 describes that, in order to reduce the printing cost, when print data is color data, monochrome printing is performed forcibly depending on permissions. Japanese Patent Laid-Open No. 2018-99895 describes that a user is allowed to confirm the forcible printing of color data in monochrome before printing.

SUMMARY OF THE INVENTION

The present invention provides an image forming apparatus, a method, and a storage medium for storing a program that allow processing to be changed among a plurality of printing modes based on upper limits of printing amounts.

The present invention in one aspect provides an image forming apparatus operable to execute a plurality of printing modes including a first printing mode and a second printing mode, the image forming apparatus comprising: an obtaining unit configured to obtain a first printable amount corresponding to an upper limit on printing according to the first printing mode and a second printable amount corresponding to an upper limit on printing according to the second printing mode; a changing unit configured to, in a case where an amount to be printed due to execution of a job designating printing according to the first printing mode exceeds the first printable amount, under a condition that the second printable amount would not be exceeded, change printing according to the first printing mode designated by the job to printing according to the second printing mode; and an execution unit configured to execute the job after the change by the changing unit to printing according to the second printing mode.

According to the present invention, processing can be changed between a plurality of printing modes based on upper limits on printing amounts.

Further features of the present invention will become apparent from the following description of exemplary embodiments with reference to the attached drawings.

BRIEF DESCRIPTION OF THE DRAWINGS

FIG. 4 is a diagram for describing patterns where a fixed amount range is exceeded.

FIG. 5 is a diagram for describing patterns where a fixed amount range is exceeded.

FIG. 8 is a diagram for describing patterns where a fixed amount range is exceeded.

FIG. 9 is a diagram illustrating a user interface screen.

FIG. 10 is a flowchart for describing a print control process.

DESCRIPTION OF THE EMBODIMENTS

Figure 1:
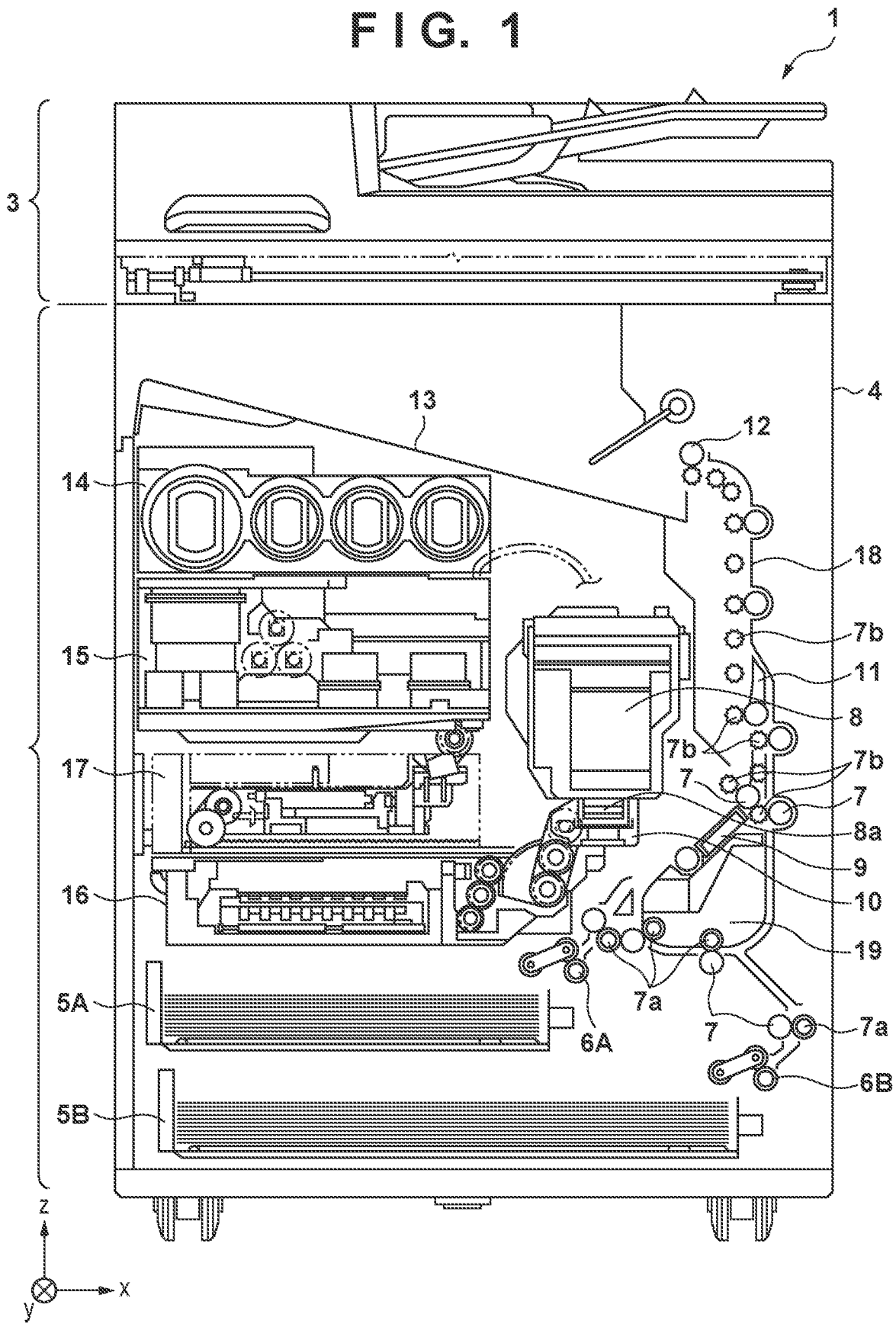
FIG. 1 is a diagram illustrating an internal configuration of an inkjet printing apparatus.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

Among printing services, there is a fixed amount system that provides a subscription service that allows a user to pay a fixed amount and print freely within a predetermined printing amount upper limit within a predetermined period of time. In the case of a printing system that bills users employing this kind of fixed amount system, an upper limit is set for each of a color printing amount and a monochrome printing amount in a predetermined period, for example, and an additional cost (charge) is generated for an amount exceeding the upper limit.

No cited document mentions that a process can be changed between a plurality of printing modes based on the upper limits of the printing amounts.

According to the present disclosure, processing can be changed between a plurality of printing modes based on upper limits on printing amounts.

First Embodiment

In the present embodiment, an inkjet printing apparatus is described as an example of an image forming apparatus capable of executing a plurality of printing modes including color printing and monochrome printing, but a printing apparatus using another printing method such as an electrophotographic method may be used.

FIG. 1 is an internal configuration diagram of an inkjet printing apparatus 1 (hereinafter, printing apparatus 1) used in the present embodiment. In FIG. 1, the x-direction is the horizontal direction, the y-direction (the direction perpendicular to the surface of the figure) is the direction in which discharge ports are arranged in a printing head 8 to be described later, and the z-direction is the vertical direction, respectively. The printing apparatus 1 is a multifunction device including a printing unit 2 and a scanner unit 3, and various processes relating to a printing operation and a reading operation can be executed individually or in conjunction by the printing unit 2 and the scanner unit 3. The scanner unit 3 includes an Auto Document Feeder (ADF) and a FlatBed Scanner (FBS), and is capable of reading (scanning) a document automatically fed by the ADF and reading a document placed on a document table of the FBS by a user. In the present embodiment, a multifunction device that comprises both the printing unit 2 and the scanner unit 3 is described, but a configuration without the scanner unit 3 may be used. FIG. 1 shows a standby state in which the printing apparatus 1 is not performing a printing operation or a reading operation.

In the printing unit 2, a first cassette 5A and a second cassette 5B for accommodating printing media (cut sheets) S are detachably installed at a vertically lower bottom portion of a housing 4. The first cassette 5A accommodates a relatively small printing medium of up to A4 size in a flat stack, and the second cassette 5B accommodates a relatively large printing medium of up to A3 size in a flat stack. In the vicinity of the first cassette 5A, a first feeding unit 6A for feeding the accommodated printing media separately one by one is provided. In the vicinity of the second cassette 5B, a second feeding unit 6B for feeding the accommodated printing media separately one by one is provided. When the printing operation is performed, the printing medium S is selectively fed from one of the cassettes.

A conveying roller 7, a discharging roller 12, a pinch roller 7a, a spur 7b, a guide 18, an inner guide 19 and a flapper 11 are a transport mechanism for guiding the printing medium S in a predetermined direction. The conveying roller 7 is disposed on the upstream side of the printing head 8 and is a driving roller driven by a conveying motor (not shown). The pinch roller 7a is a driven roller that nips and rotates the printing medium S together with the conveying roller 7. The discharging roller 12 is disposed on the downstream side of the printing head 8 and is a driving roller driven by a conveying motor (not shown). The printing medium S is transported by the spur 7b and the discharging roller 12 sandwiching the printing medium S.

A guide 18 is provided on the conveyance path of the printing medium S, and guides the printing medium S in a predetermined direction. The inner guide 19 has a curved side surface formed by a member extending in the y-direction and guides the printing medium S along that side surface. The flapper 11 is a member for switching the direction in which the printing medium S is transported during a double-sided printing operation. A discharge tray 13 is a tray for loading and holding the printing medium S discharged by the discharging roller 12 when printing operation is completed.

The printing head 8 of the present embodiment is a full-line type color inkjet printing head, and a plurality of ejection ports for ejecting ink according to the printing data are arranged in an amount corresponding to the width of the printing medium S along the y-direction in FIG. 1. When the printing head 8 is in a standby position, a discharge port surface 8a of the printing head 8 is capped by a cap unit 10 as shown in FIG. 1. When the printing operation is performed, the orientation of the printing head 8 is changed by a print controller 202, which will be described later, so that the discharge port surface 8a faces a platen 9. The platen 9 is formed of a flat plate extending in the y-direction, and supports the printing medium S on which the printing operation is performed by the printing head 8 from the back surface.

An ink tank unit 14 stores four colors of ink supplied to the printing head 8. An ink supply unit 15 is provided in the middle of the flow passage connecting the ink tank unit 14 and the printing head 8, and adjusts the pressure and the flow rate of the ink in the printing head 8 to an appropriate range. In the present embodiment, a circulation type ink supply system is employed, and the ink supply unit 15 adjusts the pressure of the ink supplied to the printing head 8 and the flow rate of the ink recovered from the printing head 8 to an appropriate range. A maintenance unit 16 includes the cap unit 10 and a wiping unit 17, and operates them at a predetermined timing to perform a maintenance operation on the printing head 8.

Figure 2:
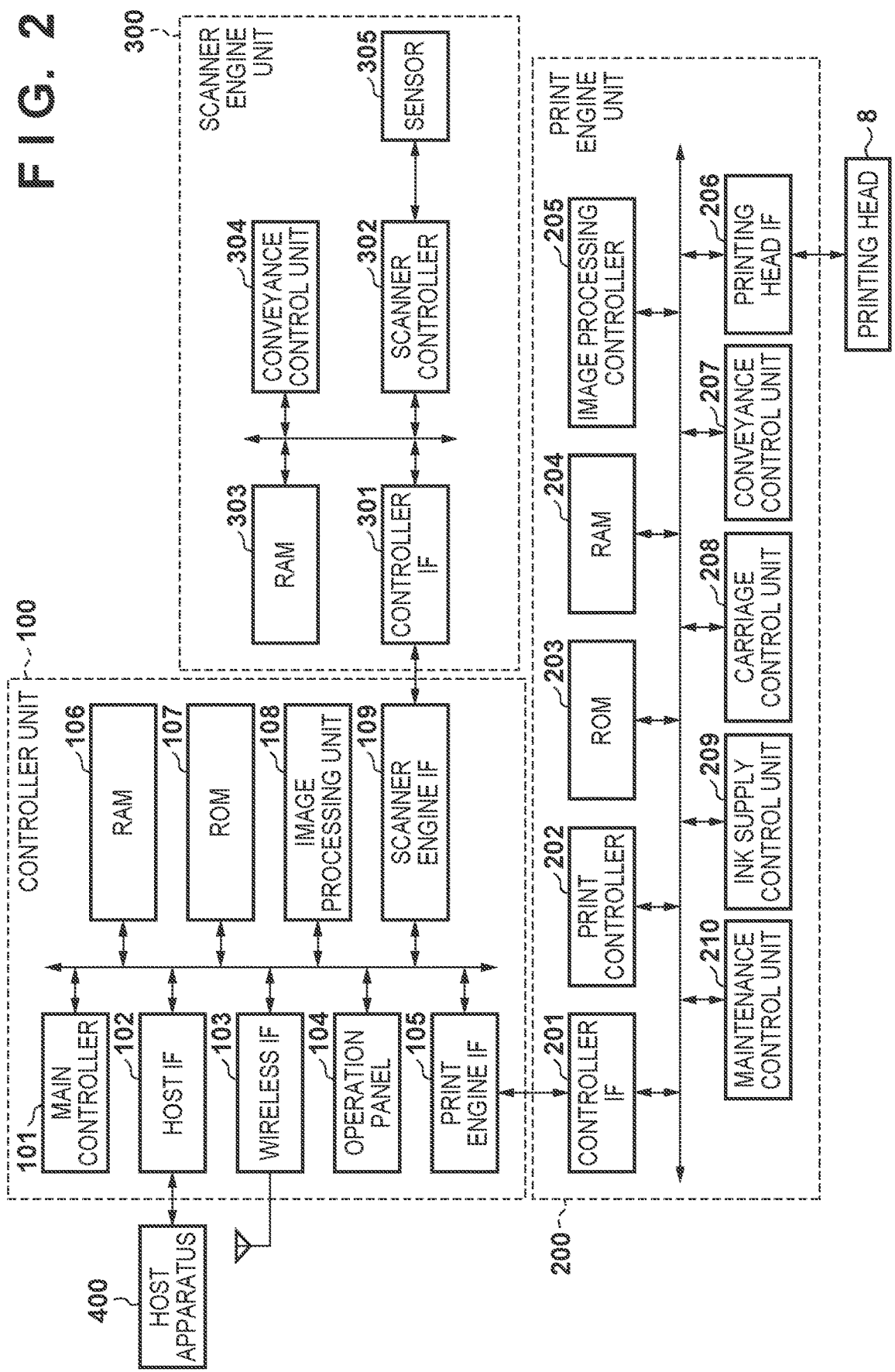
FIG. 2 is a block diagram illustrating a control configuration in the printing apparatus.

FIG. 2 is a block diagram illustrating a control configuration in the printing apparatus 1. The control configuration mainly includes a print engine unit 200 that oversees the printing unit 2, a scanner engine unit 300 that oversees the scanner unit 3, and a controller unit 100 that oversees the entire printing apparatus 1. The print controller 202 controls various mechanisms of the print engine unit 200 according to the instructions of a main controller 101 of the controller unit 100. Various mechanisms of the scanner engine unit 300 are controlled by the main controller 101 of the controller unit 100. Details of the control configuration will be described below.

In the controller unit 100, the main controller 101 including a CPU controls the entire printing apparatus 1 while using a RAM 106 as a work area according to programs and various parameters stored in a ROM 107. For example, when a print job is inputted from a host apparatus 400 such as a PC via a host I/F 102 or a wireless I/F 103, an image processing unit 108 performs predetermined image processing on the received image data according to an instruction from the main controller 101. Then, the main controller 101 transmits the image data subjected to the image processing to the print engine unit 200 via a print engine I/F 105.

The printing apparatus 1 may acquire the image data from the host apparatus 400 through wireless communication or wired communication, or may acquire the image data from an external storage apparatus (such as a USB memory) connected to the printing apparatus 1. The communication method used for wireless communication or wired communication is not particularly limited. For example, Wireless Fidelity (Wi-Fi) (registered trademark) or Bluetooth (registered trademark) may be used as a communication method used for radio communication. As a communication method used for wired communication, a Universal Serial Bus (USB) or the like can be applied. When a read command is inputted from the host apparatus 400, the main controller 101 transmits a read command to the scanner unit 3 through a scanner engine I/F 109.

An operation panel 104 is a mechanism for accepting input/output from a user to the printing apparatus 1. Input/output operations from the user may be, for example, an instruction for an operation such as copying or scanning via the operation panel 104, or a setting of a plurality of printing modes including color printing, monochrome printing, and the like. The operation panel 104 can display various user interface screens.

In the print engine unit 200, the print controller 202 including a CPU controls each mechanism comprised in the printing unit 2 while using a RAM 204 as a work area according to programs and various parameters stored in a ROM 203. Upon receipt of various commands or image data via a controller I/F 201, the print controller 202 temporarily stores the commands or data in the RAM 204. The print controller 202 controls an image processing controller 205 to convert the stored image data into printing data so that the printing head 8 can perform printing operations. When the conversion generates printing data, the print controller 202 causes the printing head 8 to perform a printing operation via a printing head I/F 206. At that time, the print controller 202 drives the feeding units 6A and 6B, the conveying roller 7, the discharging roller 12, and the flapper 11 shown in FIG. 1 through a conveyance control unit 207 to convey the printing medium S. In accordance with an instruction from the print controller 202, the printing operation by the printing head 8 is executed in conjunction with the conveyance operation of the printing medium S, and the printing process is performed.

A carriage control unit 208 changes the orientation and the position of the printing head 8 according to the operation state such as a maintenance state or a printing state of the printing apparatus 1. An ink supply control unit 209 controls the ink supply unit 15 so that the pressure of the ink supplied to the printing head 8 falls within an appropriate range. A maintenance control unit 210 controls the operation of the cap unit 10 and the wiping unit 17 in the maintenance unit 16 when performing the maintenance operation for the printing head 8.

In the scanner engine unit 300, the main controller 101 controls the hardware resources of a scanner controller 302 using the RAM 106 as a work area according to programs stored in the ROM 107 and various parameters. As a result, various mechanisms included in the scanner unit 3 are controlled. For example, the main controller 101 controls hardware resources within the scanner controller 302 via a controller I/F 301. Thus, an original mounted on the ADF by the user is conveyed through a conveyance control unit 304 and read by a sensor 305. The scanner controller 302 stores the image data read and generated in a RAM 303. The print controller 202 converts the acquired image data into printing data as described above, so that the printing head 8 can perform a printing operation based on the image data read by the scanner controller 302.

The main controller 101 is capable of communicating with a server of a fixed amount system. In the present embodiment, the host apparatus 400 will be described as a server of the fixed amount system.

Figure 3:
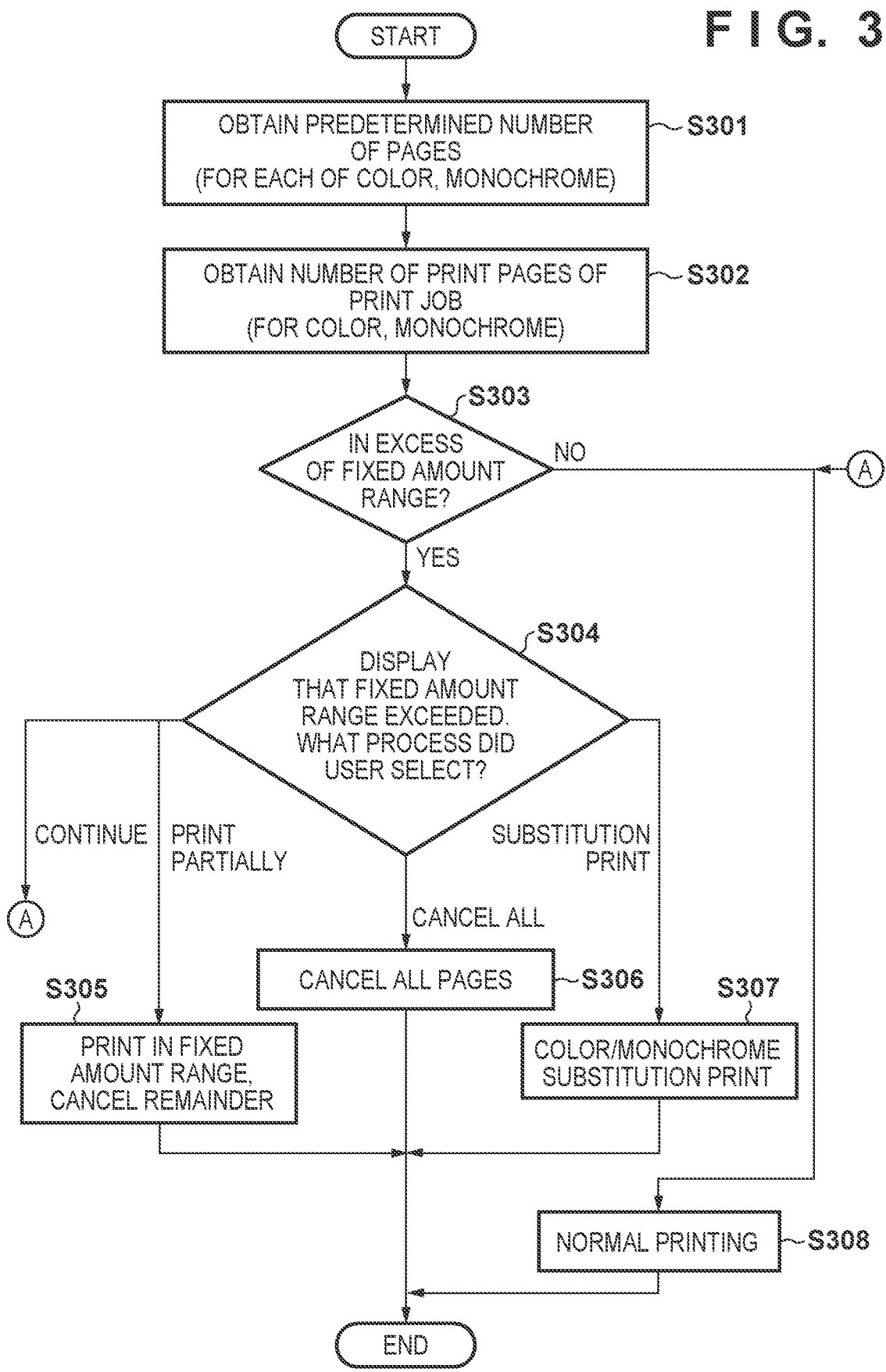
FIG. 3 is a flowchart for describing a print control process.

FIG. 3 is a flowchart showing the processing of the print control in the present embodiment. In step S301, the main controller 101 obtains the predetermined number of color print pages and number of monochrome print pages that the user is able to print from a server of the fixed amount system. The predetermined number of color print pages and the number of monochrome print pages are numbers of pages defined by the fixed amount system with which the user has a contract. The number of pages predetermined for color printing and monochrome printing may be the same, or different values may be set. In this example, it is assumed that a user can get monthly contract in a fixed amount system, and that the number of pages for color printing and the number of pages for monochrome printing are respectively set as upper limits for monthly printing. However, the fixed amount period need not be by the month. An upper limit on printing may be set for a fixed amount system that is billed by the year or by the week.

In step S302, the main controller 101 acquires a print job that the user is trying to print or acquires the number of color print pages or the number of monochrome print pages from the print job. In the present embodiment, the content of the print job that is to be printed may be both monochrome pages and color pages, but the main controller 101, for each job, either acquires the number of color print pages or the number of monochrome print pages. That is, when color printing is designated on the print setting screen, all pages included in the print job are printed as color pages, and when monochrome printing is designated on the print setting screen, all pages included in the print job are printed as monochrome pages.

In step S303, the main controller 101 acquires the number of printable pages and determines whether or not printing by the print job will exceed a fixed amount range. The number of printable pages will be described later. When it is determined that printing by the print job will not exceed a fixed amount range, in step S308, the main controller 101 processes the print job to perform printing, and then terminates the process of FIG. 3. On the other hand, when it is determined that printing by the print job will exceed a fixed amount range, in step S304, the main controller 101 displays a message screen on the operation panel 104 indicating that the printing will exceed the fixed amount range. The message screen displayed at this time is a screen that can accept a user selection instruction related to subsequent processing. For example, the message screen is displayed such that the user is able to select to, as a process to perform next, continue with the printing; continue with the printing within the fixed amount range and cancel the remaining portion; cancel printing for all pages; perform color/monochrome substitution printing. In step S304, the main controller 101 determines which process selection has been accepted on the message screen.

Figures 6, 7:
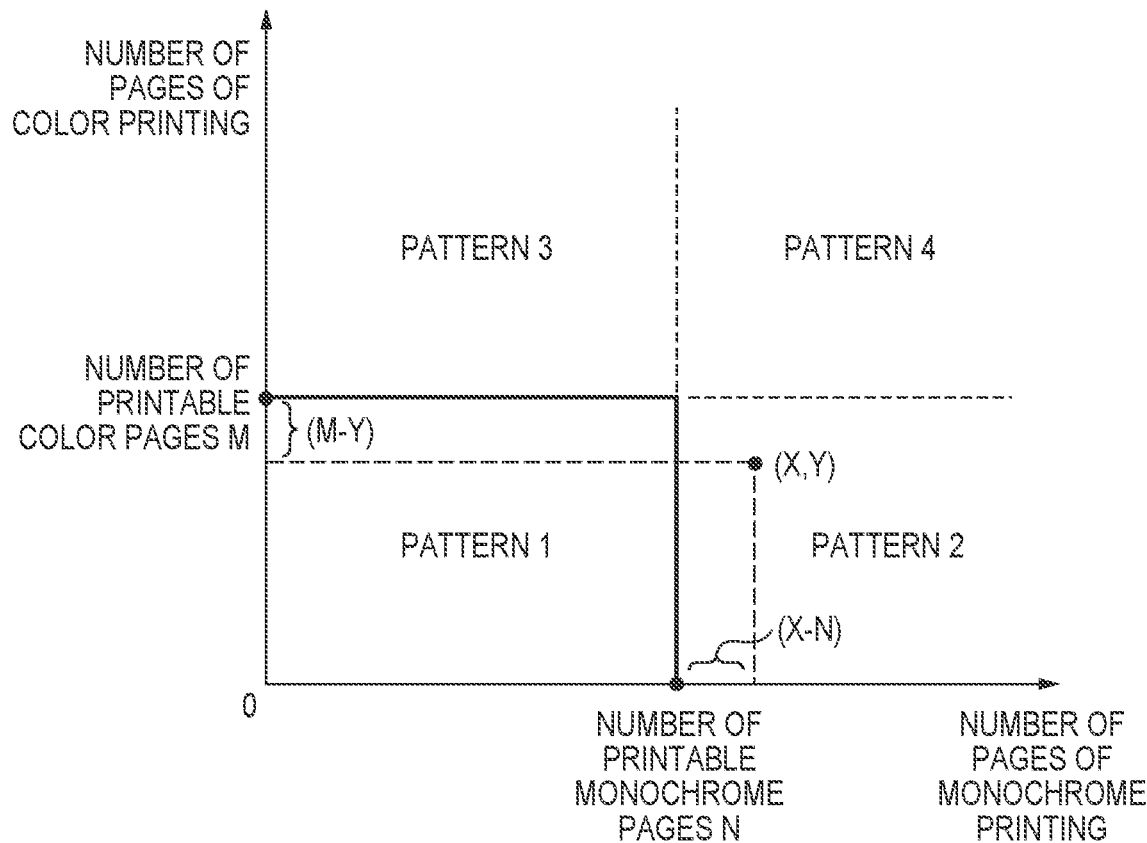
FIG. 6 is a diagram for describing patterns where a fixed amount range is exceeded.
FIG. 7 is a diagram illustrating a user interface screen.

FIG. 7 is a diagram illustrating an exemplary message screen 700 displayed in step S303. A message 701 displays a message indicating that the printing would exceed the fixed amount range. In FIG. 7, as an example, a message is displayed indicating that color printing would exceed the fixed amount range. Messages 702, 703, 704, and 705 indicate descriptions of each process that can be selected by the user. A description of a process for continuing with the printing as is displayed in the message 702. In the message 703, a description of a process for continuing with the printing within the fixed amount range and canceling the printing that would exceed the fixed amount range is displayed. The message 704 displays a description of a process for performing color/monochrome substitution printing in order to print within a fixed amount range. A description of a process for cancelling printing for all pages is displayed in the message 705. Buttons 706, 707, 708, and 709 are displayed on the message screen of FIG. 7. The button 706 is capable of receiving an instruction to execute the process of the message 702. The button 707 is capable of receiving an instruction to execute the process of the message 703. The button 708 is capable of receiving an instruction to execute the process of the message 704. The button 709 is capable of receiving an instruction to execute the process of the message 705.

When it is determined that a selection of the process for continuing with the printing is received in step S304, in step S308, the main controller 101 processes the print job to perform printing, and then terminates the process of FIG. 3. However, as a billing process, additional costs are incurred (charged additionally) as compared with the case where the processing proceeds from step S303 to step S308.

When the process for continuing with the printing within the fixed amount range and canceling the remaining amount is selected in step S304, in step S305, the main controller 101 performs only the printing within the fixed amount range regardless of whether the printing is color printing or monochrome printing, and cancels the printing that would exceed the fixed amount range. Thereafter, the processing of FIG. 3 ends. At this time, the main controller 101 may further display a message to the user on the operation panel 104 indicating that a portion exceeding the fixed amount range has not been printed.

If the process for canceling printing for all pages is selected in step S304, in step S306, the main controller 101 discards the print data of all pages, and then terminates the process of FIG. 3. At this time, the main controller 101 may further display a message to the user on the operation panel 104 indicating that printing has been cancelled for all pages.

When the process for performing color/monochrome substitution printing is selected in step S304, in step S307, the main controller 101 performs substitution printing according to a pattern regarding the fixed amount range being exceeded. Here, patterns regarding the fixed amount range being exceeded will now be described.

FIG. 4 is a diagram for describing a pattern regarding the fixed amount range being exceeded in the present embodiment. In FIG. 4, the horizontal axis represents a number of monochrome print pages, and the vertical axis represents a number of color print pages. In FIG. 4, "N" represents an amount of available monochrome printing at the time of printing, and "M" represents an amount of available color printing at the time of printing. Hereinafter, the "amount" will be described as the "number of pages". As shown in FIG. 4, the coordinate domains are classified into four regions by axes passing through N and M. Pattern 1 is an area where the number of monochrome print pages is N or less and the number of color print pages is M or less. Pattern 2 is an area where the monochrome print pages is greater than N and the number of color print pages is M or less. Pattern 3 is an area where the number of monochrome print pages is N or less and the number of color print pages is greater than M. Pattern 4 is an area where the number of monochrome print pages is greater than N and the number of color print pages is greater than M. When the number of monochrome print pages of a print job to be printed by the user is X and the number of color print pages is Y, and the coordinates (X, Y) are plotted on the graph of FIG. 4, and they are classified into one of pattern 1 to pattern 4.

As described above, in the present embodiment, either color printing or monochrome printing is performed as a job unit. Therefore, the coordinates (X, Y) generated from the number of print pages acquired in step S302 are (X, 0) when monochrome printing is set, and are (0, Y) when color printing is set.

For example, assume that the predetermined number of pages for monochrome printing that may be printed by the fixed amount system is 1000 pages and the predetermined number of pages for color printing that may be printed by the fixed amount system is 500 pages. At the time the user attempts to print, 980 pages have already been printed by monochrome printing and 400 pages have already been printed by color printing. In this case, the number of printable monochrome pages N is 20, and the number of printable color pages M is 100. That is, the main controller 101 acquires, as the number of printable monochrome/color pages, the surplus number of pages up to the predetermined number of pages. Further, in the present embodiment, since it is assumed that the print job to be printed by the user is either color printing or monochrome printing, in the case of monochrome printing, the coordinates are represented as (X, 0), and in the case of color printing, the coordinates are represented as (0, Y). For example, if the user is trying to print 50 pages of monochrome printing on one side, the coordinates on FIG. 4 are represented as (50, 0).

As a result of the analysis of the job by the main controller 101, if the coordinates are classified as pattern 1, it means that monochrome printing or color printing may be performed in the fixed amount range. In this instance, it is determined in step S303 that the printing by the print job does not exceed the fixed amount range, and normal printing is performed in step S308.

As a result of the analysis of the job by the main controller 101, if the coordinates are classified as pattern 2, it means that monochrome printing would exceed the fixed amount range. In this instance, it is determined in step S303 that the printing by the print job would exceed the fixed amount range, and the processing of step S304 is performed. Here, as shown in FIG. 5, the number of monochrome pages that would exceed the fixed amount range is X−N. In the above example, the number of printable monochrome pages N=20, and so X=50 because the user is attempting to print 50 monochrome pages. Therefore, the number of monochrome pages that would exceed the fixed amount range is X−N=50−20=30. On the other hand, the number of printable color pages in the fixed amount range is M. In the above example, the number of printable color pages M=100. In the case of pattern 2, when the value of X−N is larger than 0 and the value of X is equal to or smaller than M, the main controller 101, upon detecting that the button 708 is pressed, substitutes color printing in for the monochrome printing and executes printing. The value of X−N being larger than 0 (in other words, the fixed amount range would be exceeded) and the value of X being equal to or smaller than M means, in other words, that the number of pages to be printed is within the surplus of pages to be printed up to the fixed amount range upper limit for the substitute. In the above example, the value of X−N (=30) is greater than 0 and the condition that X (=50) be less than M (=100) is satisfied. In this case, the main controller 101 changes the print setting so as to execute the 50 pages that would have been executed as monochrome printing instead as color printing.

When the coordinates are classified as pattern 2 and the value of X is larger than M, the main controller 101 displays a message screen indicating that an N-up process for printing a plurality of pages on a single sheet would be required when it is detected that the button 708 is pressed. Here, the N-up process is multi-page printing in which a plurality of pages are printed on a single sheet.

FIG. 9 is a diagram showing an example of a screen for displaying a message indicating that the N-up process is necessary for substitution printing. As shown in FIG. 9, content regarding setting an N-up process in order to keep within the fixed amount range is displayed. For example, when X=50 and M=25, the main controller 101 displays a message 901 indicating that a 2-in-1 N-up process would be required to keep within the fixed amount range. When it is detected that a button 902 is pressed, the main controller 101 substitutes color printing in for monochrome printing and performs the N-up process to execute printing. For example, the main controller 101 changes the print setting so as to execute the 50 pages that would have been executed as monochrome printing instead as 2-in-1 color printing. When the main controller 101 detects that a button 903 is pressed, the main controller 101 displays the message screen 700 again. When the main controller 101 detects that the button 902 is pressed, the main controller 101 may display a print setting screen (not shown) to allow the user to perform an N-up process setting.

If the coordinates are classified as pattern 2, the value of X is larger than M, and even with N-up processing, the fixed amount range will be exceeded, the main controller 101 may display the button 708 is such a way as not to accept input.

As a result of the analysis of the job by the main controller 101, if the coordinates are classified as pattern 3, it means that color printing would exceed the fixed amount range. In this case as well, similar processing to that described for pattern 2 is performed. However, while color printing is substituted in for the monochrome printing in the case of classification as pattern 2, monochrome printing is substituted in for the color printing in the case of classification as pattern 3. For example, when the value of Y–M is larger than 0 and the value of Y is equal to or smaller than N, the main controller 101, upon detecting that the button 708 is pressed, substitutes color printing in for the monochrome printing and executes printing.

When the coordinates are classified as pattern 3 and the value of Y is larger than N, the main controller 101 displays a message screen indicating that an N-up process for printing a plurality of pages on a single sheet is required when it is detected that the button 708 is pressed, similarly to what was explained for FIG. 9.

If the value of Y is larger than N when the coordinates are classified as pattern 3, and even with N-up processing the fixed amount range will be exceeded, the main controller 101 may display the button 708 in such a way as to not accept input.

In the present embodiment, since the coordinates (X, Y) are a pattern represented by (X, 0) or (0, Y), the coordinates are not classified as pattern 4.

As described above, in the present embodiment, for example, when the number of monochrome pages to be printed by the user exceeds the number of printable monochrome pages, if the number of monochrome pages to be printed is within the number of printable color pages, substitution color printing is performed. If the number of monochrome pages to be printed exceeds the number of printable color pages, substitution color printing is performed having fit the number of pages within the number of printable color pages by N-up processing. With such a configuration, it is possible to print by executing a job within a fixed amount range, and it is possible to prevent the generation of an additional cost.

Further, in the present embodiment, the number of pages to be printed (the number of color pages to be printed or the number of monochrome pages to be printed for example) is used in the explanation as the printing amount units. However, the printing amount units are not limited to the number of pages to be printed, and may be, for example, the number of sheets to be printed. In this case, in the case of single-sided printing, the number of printed sheets is equivalent to the number of print pages as described in the present embodiment. Further, points may be used as the units of the printing amount. In the case of points, in a fixed amount system, a predetermined number of points is given for color printing and monochrome printing, respectively. For example, monochrome printing (one side) of A4 paper is set to cost one point, and color printing (one side) of A4 paper three points, and the points are consumed each time printing is executed. For example, double-sided printing consumes twice as much points as single-sided printing, and A3 paper printing consumes twice as much points as A4 paper printing. That is, it is possible to calculate the number of printable pages for each of color printing and monochrome printing from the remaining points registered in the fixed amount system. Since the calculated number of pages corresponds, for example, to the number of printable monochrome pages N and the number of printable color pages M in FIG. 4, the processing of the present embodiment is thereafter executed.

Second Embodiment

Hereinafter, a second embodiment will be described with reference to differences from the first embodiment. The first embodiment describes a case in which the number of color print pages or the number of monochrome print pages is acquired on a job-by-job basis in step S302 of FIG. 3. In the present embodiment, in step S302 of FIG. 3, the main controller 101 analyzes the print job data and acquires the number of color print pages and the number of monochrome print pages, respectively. The main controller 101 stores in the RAM 106 information indicating whether color printing or monochrome printing is to be performed for each page.

In this embodiment, both color printing and monochrome printing are performed upon executing a print job. That is, as shown in FIG. 6, the X and Y values of the coordinates (X, Y) generated in step S302 may both take integer values greater than 0. Hereinafter, the patterns in the case where X and Y are both non-zero will be described.

As a result of the analysis of the job by the main controller 101, if the coordinates are classified as pattern 1, it means that monochrome printing and color printing may be performed in a fixed amount range. In this instance, it is determined in step S303 that the printing by the print job does not exceed the fixed amount range, and normal printing is performed in step S308.

As a result of the analysis of the job by the main controller 101, if the coordinates are classified as pattern 2, it means that the number of monochrome pages exceeding the fixed amount range is "X–N" as illustrated in FIG. 6. On the other hand, the surplus until the number of printable color pages M is reached in the fixed amount range is "M–Y". In the present embodiment, when the value of "X–N" is equal to or less than the value of "M–Y" and the button 708 is pressed on the message screen 700, the printing is performed by substituting in color printing for the monochrome printing that would exceed the limit.

For example, assume the number of printable monochrome pages N is 20, and the number of printable color pages M is 100. Assume that the user wants to print 50 one-sided pages, 30 of which are monochrome printing targets, and 20 of which are color printing targets. In such a case, for monochrome printing, X–N=30–20=10 pages exceed the fixed amount range, and therefore, an additional cost would be incurred. On the other hand, for color printing, M–Y=100–20=80 pages is within the surplus of the number of printable color pages M in the fixed amount range. Therefore, the main controller 101 changes the print setting from monochrome printing to color printing for the 10 monochrome print pages that exceed the limit and then prints. As a result, both monochrome printing and color printing can be performed within the fixed amount range.

It has been described above that when the button 708 is pressed, color printing is substituted in for the monochrome printing that exceeds the limit. When the button 708 is pressed, for example, a screen on which the user can select the ten pages for which to perform the substitution printing may be displayed on the operation panel 104.

As a result of the analysis of the job by the main controller 101, if the coordinates are classified as pattern 3, it means that color printing would exceed the fixed amount range. In this case as well, similar processing to that described in pattern 2 is performed. However, while color printing is substituted in for the monochrome printing in the case of classification as pattern 2, monochrome printing is substituted in for the color printing in the case of classification as pattern 3. For example, the number of color pages exceeding the fixed amount range is "Y–M". On the other hand, the surplus until the number of printable monochrome pages N is reached in the fixed amount range is "N–X". When the value of "Y–M" is equal to or less than the value of "N–X" and the button 708 is pressed on the message screen 700, the printing is performed by substituting in monochrome printing for the excess amount in color printing.

As a result of the analysis of the job by the main controller 101, if the coordinates are classified as pattern 4, it means that color printing and monochrome printing would both exceed the fixed amount ranges. FIG. 8 is a diagram showing an example in which coordinates are classified as pattern 4. In the present embodiment, in this case, the user is prompted to use an N-up process. That is, by an N-up process, the actual number of pages to be printed, that is, the value of X and Y, is reduced. When the classification changes to one of patterns 1 to 3 due to the N-up processing, substitution printing is performed as described above.

FIG. 10 is a flowchart showing a process executed by the main controller 101 when the coordinates are classified as pattern 4. The process of FIG. 10 is started when the button 708 of the message screen 700 of FIG. 7 is pressed and it is determined that the coordinates are classified as pattern 4.

In step S1001, the main controller 101 displays a message screen prompting use of an N-up process on the operation panel 104. In the message screen, for example, "When N-up processing is performed, color/monochrome substitution printing may enable printing to be performed within the fixed amount ranges". The message "Do you wish to perform N-up processing?" is displayed. Further, when an instruction to perform the N-up process is received on the message screen, in step S1002, the main controller 101 displays a print setting screen on the operation panel 104. Further, when an instruction not to perform an N-up process is received on the message screen, the message screen 700 of FIG. 7 is displayed again. However, it is preferable to display the buttons 707 and 708 so as not to be selectable in the message screen 700, such as graying out the messages 703 and 704 and the buttons 707 and 708.

When the user performs an N-up setting on the print setting screen and instructs print execution, in step S1003, the main controller 101 determines whether or not the coordinates are classified as any of patterns 1 to 3 due to the N-up setting. Here, when it is determined that the coordinates are not classified as any of patterns 1 to 3, the main controller 101 again displays a message screen prompting use of the N-up process in step S1001 on the operation panel 104. On the other hand, when it is determined that the coordinates are classified into one of patterns 1 to 3, in step S1004, the main controller 101 executes substitution printing according to the respective patterns, as described above.

As described above, according to the present embodiment, when a fixed amount range would be exceeded by either the number of color printed pages or the number of monochrome printed pages to be printed by the user, monochrome/color substitution printing is performed for the portion that would exceed the limit. Further, when the fixed amount ranges would be exceed by both the number of color printed pages and the number of monochrome printed pages, the user is prompted to use of an N-up process, and based on the result, monochrome/color substitution printing is performed. With such a configuration, it is possible for a user to print within a fixed amount range, and it is possible to prevent the generation of additional costs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-132063, filed Aug. 13, 2021, which is hereby incorporated by reference herein in its entirety.

What is claimed is:

1. An image forming apparatus operable to execute a plurality of printing modes including a first printing mode and a second printing mode, the image forming apparatus comprising:

at least one memory containing instructions and at least one processor for executing the instructions to function as:

an obtaining unit configured to obtain a first printable amount corresponding to an upper limit on printing according to the first printing mode and a second printable amount corresponding to an upper limit on printing according to the second printing mode;

a first displaying unit configured to, in a case where an amount to be printed due to execution of a job designating printing according to the first printing mode exceeds the first printable amount, display a screen which is able to accept an instruction for changing printing according to the first printing mode designated by the job to printing according to the second printing mode;

a second displaying unit configured to, based on the instruction being accepted on the screen, display a print setting screen which is able to accept a change of print setting of the job, and an execution unit configured to, in a case where an amount printed according to the second printing mode would not exceed the second printable amount if print setting of the job is changed to print setting accepted in the print setting screen, execute the job after the change in which print setting of the job is changed to print setting accepted in the print setting screen, wherein in a case where an amount printed according to the second printing mode would exceed the second printable amount even if print setting of the job is changed to print setting accepted in the print setting screen, the print setting screen is repeatedly displayed until print setting of the job is set such that the amount to be printed on printing according to the second printing mode does not exceed the second printable amount.

2. The image forming apparatus according to claim 1, wherein all the printing according to the first printing mode is changed to printing according to the second printing mode.

3. The image forming apparatus according to claim 1, wherein the screen which is able to accept the instruction is a scree in which a multi-page print for printing a plurality of pages on a single sheet is able to be set.

4. The image forming apparatus according to claim 1, wherein
printing according to the first printing mode and printing according to the second printing mode are designated by the job, and
in a case where an amount printed in the first printing mode would exceed the first printable amount due to execution of the job, a portion that would exceed the first printable amount is changed to printing according to the second printing mode.

5. The image forming apparatus according to claim 4, wherein in a case where an amount printed by the first printing mode would exceed the first printable amount and an amount printed by the second printing mode would exceed the second printable amount due to execution of the job, a change between printing according to the first printing mode and printing according to the second printing mode is performed.

6. The image forming apparatus according to claim 1, wherein the at least one memory and at least one processor further function as a determination unit configured to determine whether or not an amount printed in the first printing mode would exceed the first printable amount due to execution of the job.

7. The image forming apparatus according to claim 6, wherein the at least one memory and at least one processor further function as an accepting unit configured to, in a case where it is determined by the determination unit that an amount printed by the first printing mode would exceed the first printable amount, accept a selection of one of a plurality of processes, wherein
in a case where a selection of a first process of the plurality of processes is accepted by the accepting unit, the screen which is able to accept the instruction is displayed.

8. The image forming apparatus according to claim 7, wherein, in a case where a selection of a second process of the plurality of processes is accepted by the accepting unit, the execution unit cancels the job.

9. The image forming apparatus according to claim 7, wherein, in a case where a selection of a third process of the plurality of processes is accepted by the accepting unit, the execution unit executes the job so as to perform printing according to the first printing mode in a range that would not exceed the first printable amount and cancels a portion that would exceed the first printable amount.

10. The image forming apparatus according to claim 1, wherein the upper limit on printing according to the first printing mode is an upper limit on a number of pages that are printable within a fixed amount range for printing according to the first printing mode, and the upper limit on printing according to the second printing mode is an upper limit on a number of pages that are printable within a fixed amount range for printing according to the second printing mode.

11. The image forming apparatus according to claim 10, wherein the first printable amount is a number of pages to be printed until the upper limit on the number of pages that are printable within the fixed amount range is reached for printing according to the first printing mode, and the second printable amount is a number of pages to be printed until the upper limit on the number of pages that are printable within the fixed amount range is reached for printing according to the second printing mode.

12. The image forming apparatus according to claim 1, wherein the first printing mode is a mode for performing color printing, and the second printing mode is a mode for performing monochrome printing.

13. A method executed in an image forming apparatus operable to execute a plurality of printing modes including a first printing mode and a second printing mode, the method comprising:
obtaining a first printable amount corresponding to an upper limit on printing according to the first printing mode and a second printable amount corresponding to an upper limit on printing according to the second printing mode;
in a case where an amount to be printed due to execution of a job designating printing according to the first printing mode exceeds the first printable amount, displaying a screen which is able to accept an instruction for changing printing according to the first printing mode designated by the job to printing according to the second printing mode;
displaying a print setting screen which is able to accept a change of print setting of the job based on the instruction being accepted on the screen,
in a case where an amount printed according to the second printing mode would not exceed the second printable amount if print setting of the job is changed to print setting accepted in the print setting screen, executing the job in which print setting of the job is changed to print setting accepted in the print setting screen, and
in a case where an amount printed on printing according to the second printing mode would exceed the second printable amount even if print setting of the job is changed to print setting accepted in the print setting screen, repeatably displaying the print setting screen until print setting of the job is set such that the amount to be printed on printing according to the second printing mode does not exceed the second printable amount.

14. A non-transitory computer-readable storage medium storing a program configured to cause a computer to function to:
obtain a first printable amount corresponding to an upper limit on printing according to a first printing mode and a second printable amount corresponding to an upper limit on printing according to a second printing mode;
in a case where an amount to be printed due to execution of a job designating printing according to the first printing mode exceeds the first printable amount, display a screen which is able to accept an instruction for changing printing according to the first printing mode designated by the job to printing according to the second printing mode;
display a print setting screen which is able to accept a change of print setting of the job based on the instruction being accepted on the screen,
in a case where an amount printed according to the second printing mode would not exceed the second printable amount if print setting of the job is changed to print setting accepted in the print setting screen, execute the job in which print setting of the job is changed to print setting accepted in the print setting screen, and in a case where an amount printed on printing according to the second printing mode would exceed the second printable amount even if print setting of the job is changed to print setting accepted in the print setting screen, repeatably display the print setting screen until print setting of the job is set such that the amount to be printed on printing according to the second printing mode does not exceed the second printable amount.

* * * * *